Figure 1:
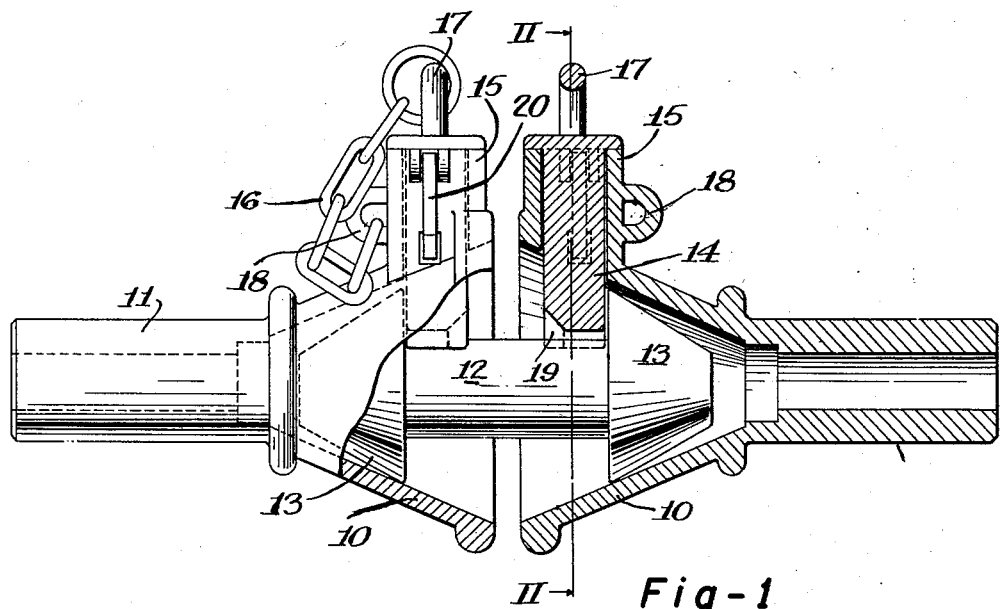

Aug. 24, 1954  D. O. TURNER  2,687,221
AUTOMATIC MINE CAR COUPLING
Filed Jan. 3, 1950

INVENTOR.
DEWEY O. TURNER
BY
ATTORNEY

Patented Aug. 24, 1954

2,687,221

UNITED STATES PATENT OFFICE 2,687,221

AUTOMATIC MINE CAR COUPLING

Dewey O. Turner, Pine Grove, Calif., assignor, by decree of distribution, to Dessie Turner Application January 3, 1950, Serial No. 136,559

3 Claims. (Cl. 213—185)

This invention relates to car couplings and particularly to improvements on the type of coupling ordinarly used on mining cars and the like.

It is the object of the invention to provide a car coupling that automatically and securely couples cars together as they approach one another and to provide a car coupling that is manufactured of relatively few simple parts automatically and securely latched in their coupling position by a novel arrangement of gravity latches. Another object of the invention is to provide a gravity controlled coupling mechanism that will remain in coupled position even though it be inverted as in a car dumping operation. Further and more specific objects and advantages of the invention are made apparent in the following specification by reference to the accompanying drawings wherein the invention is described in detail.

Figure 2:
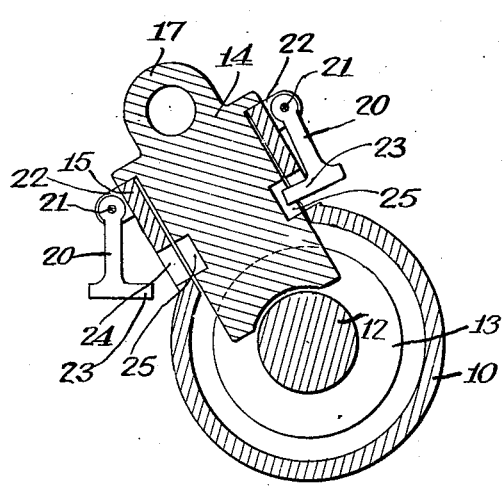

In the drawings:

Fig. 1 is a view in side elevation with parts broken away and parts shown in section of a car coupling embodying the present invention, and Fig. 2 is a transverse sectional view taken on the line II—II of Fig. 1 and illustrating the coupling in a tilted position.

In the drawings the coupling of the present invention is shown as comprising a pair of frusto-conical sockets 10 each carried by a support 11 adapted to be carried by the end of a car, not shown. The position of the sockets on the car is such that they will aline with and face each other as illustrated in Fig. 1 of the drawings upon the approach of one car toward another along the conventional track. A coupling link 12 cooperates with the sockets and has an enlarged frusto-conical head 13 at each end adapted to be received within one of the sockets 10. Each of the sockets carries a latch bolt 14 slidable in a radial direction in a guideway 15 associated with the socket and preferably formed as an integral part thereof as shown. The latch bolts 14 and guides therefor are preferably disposed on the upper side of the socket so that the latches are urged downwardly by gravity and cooperate as shown in Fig. 1 with the frusto-conical heads 13 of the coupling link to retain the ends of the link in the sockets and thus connect together adjoining cars by which the sockets are carried.

To prevent complete separation of the latch bolts from the sockets, each may be secured to its socket by a chain such as shown at 16 connected between an eye 17 on the latch bolt and an eye 18 on the guide. The lower edge of each of the latch bolts 14 is preferably rounded and beveled as indicated at 19 so that it will be engaged by and ride over the frusto-conical head of the coupling link as it enters the socket 10.

In operation, the coupling link 12 which is reversible by virtue of its construction may be carried in either of the sockets 13 and retained therein by the latch bolt 14. One end of the latch bolt will protrude from the socket in a position to enter the socket on another car and as the cars approach, the protruding end will strike and raise the latch bolt 14 and become latched in place so that the cars are securely coupled together entirely automatically.

It is common practice with mining cars and other similar cars to discharge their contents by inverting them. This is accomplished by clamping a car to a special section of rail which can be turned upside down. Obviously with the present construction inverting the cars would tend to incouple them because the latch bolt 14 would in inverted position gravitate toward its unlatched position. This is prevented by a pair of latching levers 20 pivotally supported as by pins 21 which pass through ears 22 formed on the sides of the latch bolt guides 15. Each of the levers 20 has an inwardly projecting finger 23 at its lower end extending, when the coupling is in a normal upright position, through an opening 24 in the side of the guide 15 but not projecting into a socket 25 formed one on each side of the latch bolt 14. Therefore when the assembled couplings are in their normal vertical position, the ends of the locking levers 20 do not interfere with normal operation of the latch bolt. However upon rocking of the car, even a few degrees toward either side as during the initial part of a dumping operation, one or the other of the locking levers 20 will assume a locking position to prevent release of the latch bolt. This is illustrated in Fig. 2 wherein the coupling is shown as tilted or rocked toward the left and the end 23 of the right hand locking lever 20 has entered the socket 25 in the latch bolt. This prevents retraction of the latch bolt but as the car is returned to its normal position both levers 20 again swing to the positions where the latch bolt may be retracted.

I claim:

1. A car coupling comprising a pair of socket members adapted to be carried on cars in position for registry as the cars approach each other, a coupling link having a head on each end for reception by either socket, a gravity actuated latch bolt projecting into each socket to engage and retain a head of the latch pin in the socket, and a pivoted locking lever normally depending in an unlocked position and urged by gravity into locking engagement with the latch bolt to prevent it retraction from a latching position when the coupling rocked toward an inverted position.

2. A car coupling comprising a pair of socket members adapted to be carried on cars in position for registry as the cars approach each other, a coupling link having a head on each end for reception by either socket, a gravity actuated latch bolt projecting into each socket to engage and retain a head of the latch pin in the socket, vertically extending guide means for each latch bolt, said guide means having openings in opposite sides, said latch bolt having sockets registering with said openings when it is in latched position, and a pair of pivoted locking levers normally depending with ends adjacent said openings and sockets whereby one lever end will swing into one of said sockets and prevent retraction of the latch bolt when the coupling is rocked toward an inverted position.

3. In a car coupling of the character described for use on cars that are inverted to discharge their contents, a gravity actuated latch bolt slidable in one coupling part and engageable with another to prevent separation of the coupling parts, and a pair of pivoted gravity actuated latches one on either side of the coupling engageable with the latch bolt as the coupling moves toward an inverted position so that one latch will engage the latch bolt upon inverting of the car in either direction to prevent the bolt from moving toward its release position.

References Cited in the file of this patent

UNITED STATES PATENTS

| Number | Name | Date |
|---|---|---|
| 252,316 | Hendryx | Jan. 17, 1882 |
| 428,928 | Moomaw | May 27, 1890 |
| 487,632 | Mitchell | Dec. 6, 1892 |
| 584,519 | Pfingst | June 15, 1897 |
| 584,650 | Richey | June 15, 1897 |
| 587,452 | Quisenberry | Aug. 3, 1897 |
| 1,847,806 | Banshak | Mar. 1, 1932 |
| 2,509,459 | Stamber | May 30, 1950 |
| 2,582,747 | Cossey et al. | Jan. 15, 1952 |